A. H. GIBSON.
CENTRIFUGAL BRAKE FOR POWER TRUCKS.
APPLICATION FILED JULY 24, 1917.
1,352,060.
Patented Sept. 7, 1920.
2 SHEETS—SHEET 1.
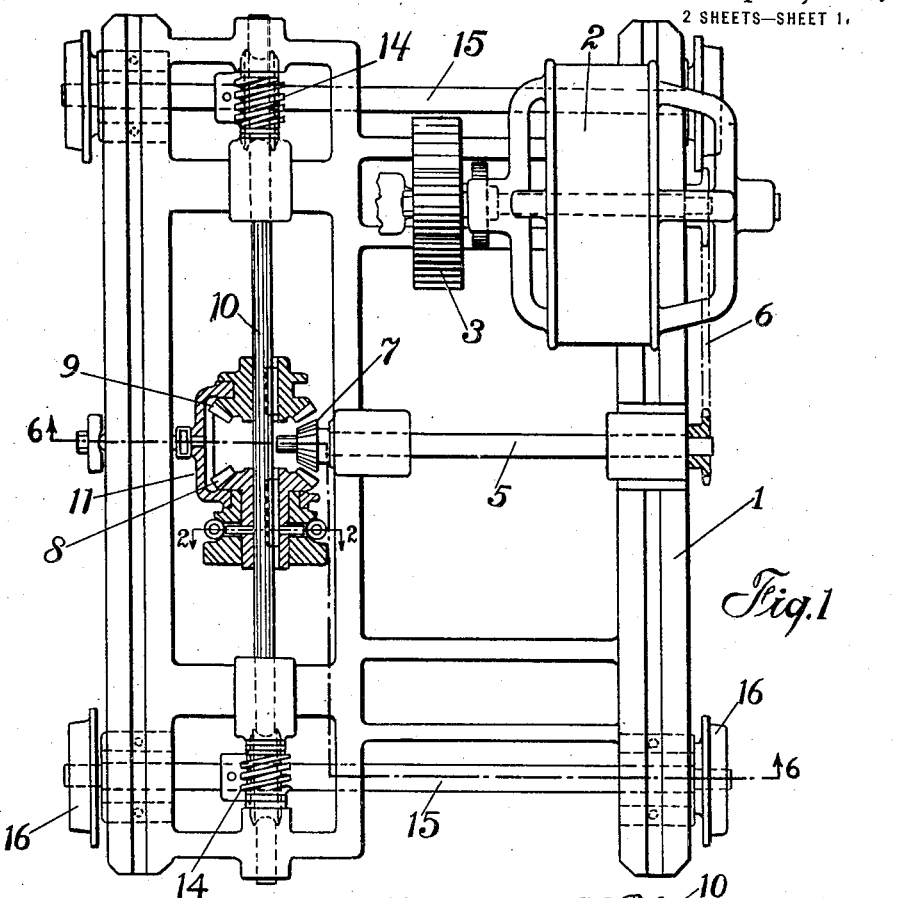
Fig.1
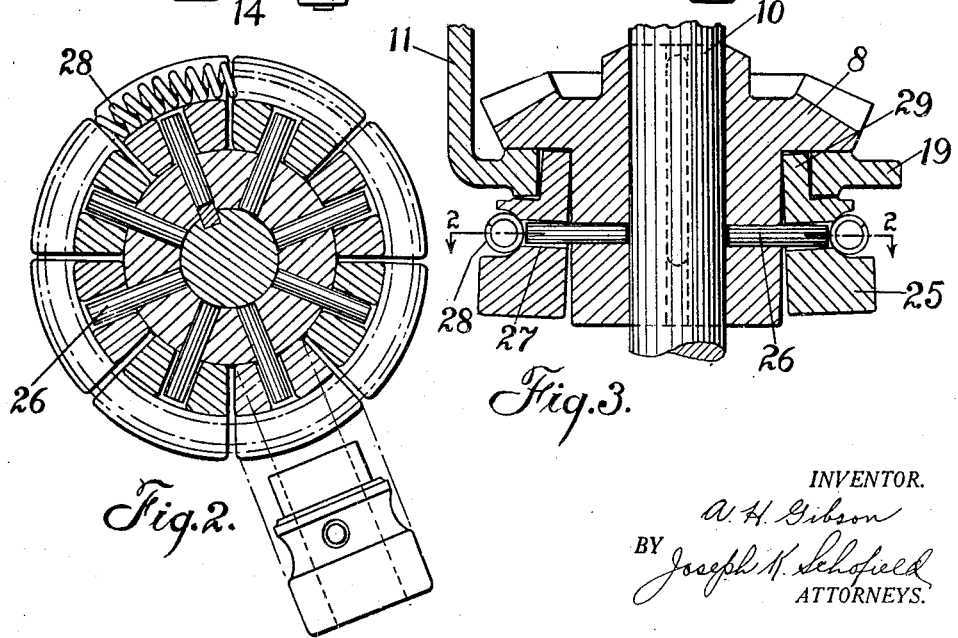
Fig.2
Fig.3
INVENTOR.
A. H. Gibson
BY Joseph K. Schofield
ATTORNEYS.

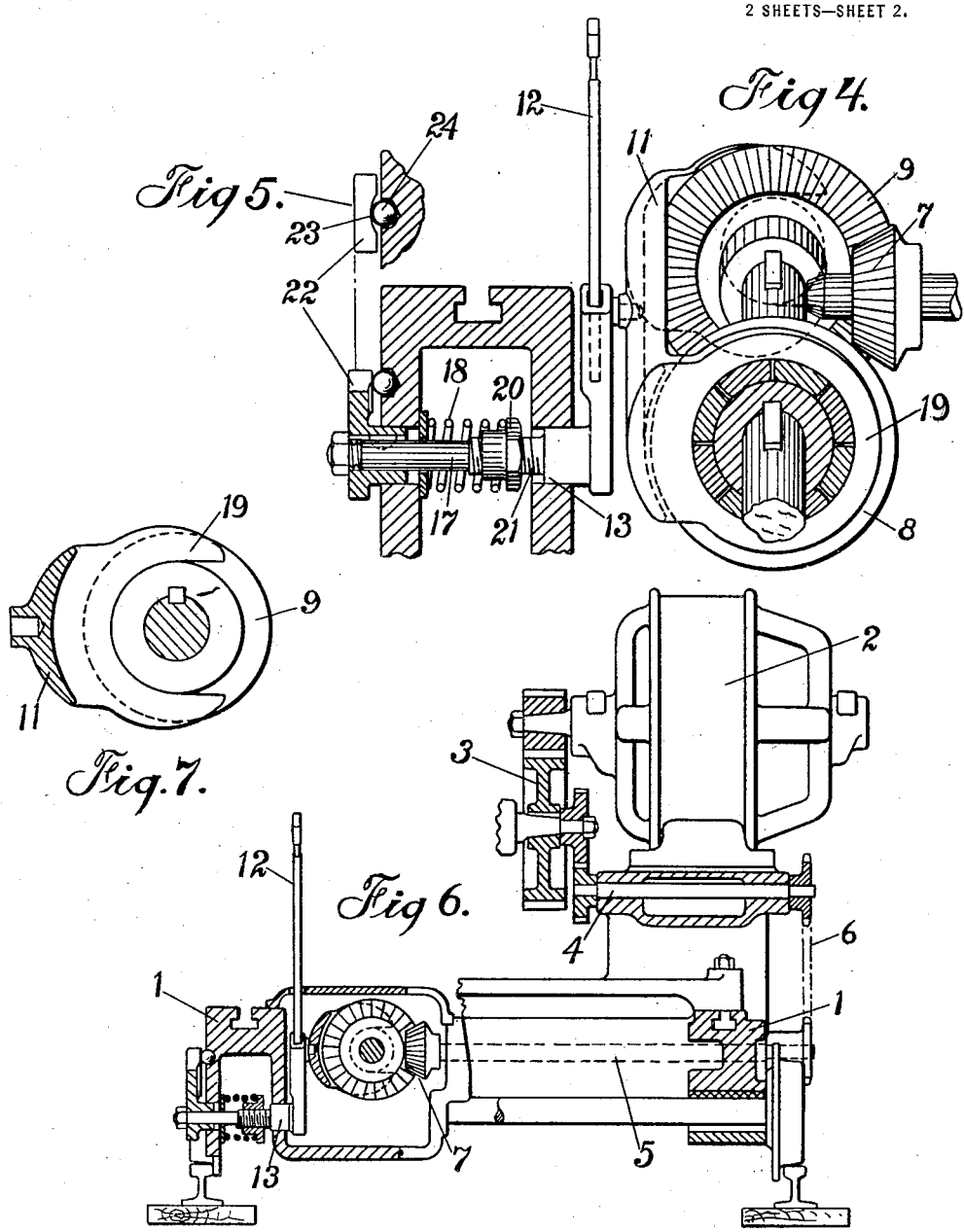

UNITED STATES PATENT OFFICE.

ARTHUR H. GIBSON, OF EASTON, PENNSYLVANIA, ASSIGNOR TO INGERSOLL-RAND COMPANY, OF JERSEY CITY, NEW JERSEY, A CORPORATION OF NEW JERSEY.

CENTRIFUGAL BRAKE FOR POWER-TRUCKS.

1,352,060.  Specification of Letters Patent.  Patented Sept. 7, 1920.

Application filed July 24, 1917. Serial No. 182,439.

*To all whom it may concern:*

Be it known that I, ARTHUR H. GIBSON, a subject of the Crown of Great Britain, residing at Easton, in the county of Northampton and State of Pennsylvania, have invented a certain new and useful Improvement in Centrifugal Brakes for Power-Trucks, of which the following is a specification.

This invention relates to driving mechanism for power driven trucks and in particular to a driving mechanism applied to trucks mounting stone working tools such as channelers and the like and has to do particularly with means for retarding the speed of movement of such trucks when the same exceeds a predetermined maximum. In this class of trucks the speed is very slow and the truck is very heavily loaded by the channeler or other machine mounted upon it.

The objects of my invention are to improve the driving mechanism of the trucks referred to above; to enable them to be easily reversed and to prevent them from exceeding a definite maximum speed. Also, my invention includes a brake operated by the controlling lever for the reversing mechanism so that the brake may be readily applied when the reversing mechanism is in its neutral position and removed when said reversing mechanism is in either operating position.

With these and other objects in view my invention consists in the features of construction and operation set forth in the following specification.

In the drawings annexed hereto and forming a part hereof,

Figure 1 shows a top plan view of my invention applied to a truck, parts being shown in section;

Fig. 2, a section on line 2—2 of Fig. 1, showing also one of the centrifugal members;

Fig. 3, an enlarged view of a portion of the reversing mechanism with the centrifugal brake members extended to engage the yoke member;

Fig. 4, a perspective view of the reversing mechanism;

Fig. 5, a detail view of the same;

Fig. 6, an elevational view of the truck showing the motor and driving connections;

Fig. 7, a detail view of one end of the yoke member.

Referring more particularly to the drawings, 1 refers to the truck frame or body which preferably takes the form of an open frame made up of steel or iron sections. Mounted upon this truck body 1 is a motor 2 which, through suitable driving means such as gears 3 drives a shaft 4, which, in turn, drives the main shaft 5 through a sprocket or other chain 6. The main shaft 5 is provided at one end with a bevel pinion 7 which meshes with the reversing bevel gears 8 and 9 which are slidably mounted on shaft 10 and held spaced apart from each other by a yoke piece 11 presently to be more fully described. In order to move the yoke piece 11 so that either gear 8 or 9 will be placed in mesh with the pinion 7, a lever 12 is provided pivoted to the frame or body 1, at 13. Operation of this lever throws either one of the gears 8 or 9 in mesh with pinion 7, and thus, through the shaft 10 to which the gears 8 and 9 are splined, moves the truck forwardly or backwardly through worms 14 and shafts 15 to which the truck wheels 16 are fastened.

Referring now to Fig. 4, this figure shows clearly the method of mounting the lever 12. The lever 12 is oscillated about a shaft 17 at right angles to the lever which passes through holes provided for it in the frame 1. A spring 18 presses the shaft 17 and consequently the lever 12 and yoke member 11 inwardly so that extensions 19 of the yoke member 11 are pressed firmly against the bevel gears 8 and 9. One of these extensions 19 is shown in Fig. 7 and extends but partly around the gear. The pressure of the spring 18 may be regulated by means of a nut 20 on a threaded portion 21 of the shaft 17. This pressure of the spring 18 may be increased to such an amount that it is sufficient to force the extensions 19 against the gears 8 and 9 to hold the reversing mechanism locked together so that the truck cannot move. In order that this force operating to lock the reversing mechanism may be exerted only when the lever 12 and gears 8 and 9 are in neutral position the following mechanism is provided. On the end of the shaft 17 is located a cam plate 22 rigidly secured to the shaft in any well known manner. This cam plate 22 has a depression 23 on its inner face into which a ball 24 secured in the frame or body 1 of the truck is adapted to rest when the lever 12 is in mid or vertical position. When the lever is in vertical position it will be evident from the above that the shaft 17, the lever 12 and the yoke member 11 will be free to move slightly to the right and thus the projections 19 of the yoke member 11 will be firmly pressed against the gears 8 and 9, thus holding them stationary. When, however, the lever 12 is moved to either operating position, the ball 24 will be forced out of the depression 23 against the pressure of spring 18 and thus the yoke member 11 and shaft 17 will be moved slightly to the left and the projections 19 freed from engagement with the gears 8 and 9 and allowing the gears 8 and 9 to be easily operated in either direction by engagement with the pinion 7.

Referring now to Figs. 1, 2 and 3, the gear 8 is shown surrounded by a plurality of members 25 forming a continuous circle about the gear 8. These members 25 are held in place by pins 26, placed radially in the gear 8 and extending through holes 27 provided in the centrifugal members 25. The holes 27 are large enough to permit a slight movement of the members 25. Surrounding the members 25 is a helical spring 28 which not only serves to hold the pins 26 in place but also to hold the member 25 yieldingly against the gear 8. The members 25 are each provided with extensions 29 extending beneath the extension 19 of the yoke member 11 which in this case takes the form of an entire circle. From this construction it will be obvious that as long as the speed of the truck and consequently the revolutions of the shaft 10 are within a definite maximum the spring 28 will continue to retain the members 25 against the gear 8 and allowing the gear to revolve without the projections 29 binding against the extension 19 of the yoke member 11. However, as soon as a critical speed is reached the centrifugal force of members 25 will overcome the pressure of spring 28, allowing the members 25 to move outwardly, cramping the projections 29 against the part 19, as clearly shown in Fig. 3. This will have the effect of causing sufficient friction between projections 29 and part 19 that the speed of the truck and revolutions of shaft 10 will be prevented from increasing above a definite safe speed.

It is to be understood that the present showing and description disclose only one specific embodiment of my present invention, and that other forms and modifications are included within the spirit and scope thereof, as expressed in the appended claims.

What I claim is:

1. In a power driven truck, in combination, a reversing mechanism and a centrifugal brake mounted thereon, having members to frictionally engage a non-rotating member of said reversing mechanism when the speed of said truck exceeds a maximum.

2. In a power driven truck, in combination, a reversing mechanism and a centrifugal brake mounted thereon, said brake provided with a plurality of centrifugal members normally held against one of the rotating members of the reversing mechanism and adapted when the speed of the truck exceeds a maximum to frictionally engage one of the non-rotating members of said reversing mechanism.

3. In a power driven truck, in combination, a reversing mechanism and a centrifugal brake mounted thereon, said brake provided with a plurality of centrifugal members engaging a rotating member of the reversing mechanism and rotating therewith, and adapted when the speed of the truck exceeds a maximum to frictionally engage a non-rotating member of the reversing mechanism.

4. In a power driven truck, in combination, a reversing mechanism comprising a beveled pinion gear adapted to mesh with either of a pair of slidably mounted beveled gears and a centrifugal brake mounted thereon, said brake having members fitting around the hub of one of said slidably mounted gears and adapted when the speed of the truck exceeds a maximum to engage a non-rotating member of the reversing mechanism to effectually retard the speed of the truck.

5. A centrifugal brake comprising, in combination, a rotating shaft, a braking abutment, a gear on said shaft, a plurality of braking members circumferentially disposed about said gear, means for retaining said members in place, and yielding means for maintaining said brake in inoperative position until the speed of the shaft attains a predetermined maximum.

6. A centrifugal brake comprising in combination a rotating shaft, a fixed braking abutment adjacent thereto, a gear slidably mounted on said shaft, a plurality of braking members disposed circumferentially about said gear, pins radially mounted on said gear for holding said braking members in place about said gear and yielding means for maintaining said brake in inoperative position until the speed of the shaft attains a predetermined maximum.

7. A centrifugal brake comprising in combination a rotating shaft, a fixed braking abutment adjacent thereto, a gear slidably mounted on said shaft, a plurality of braking members disposed circumferentially about said gear, pins radially mounted on said gear for holding said braking members in place about said gear and a helical spring for maintaining said brake in inoperative position until the speed of the shaft attains a predetermined maximum.

8. A centrifugal brake comprising in combination a rotating shaft, a braking abutment, a gear on said shaft, a plurality of braking members circumferentially disposed about said gear, means for retaining said members in place, said members having a limited movement in either direction circumferentially of said gear, and yielding means for maintaining said brake in inoperative position until the speed of the shaft attains a predetermined maximum.

9. A centrifugal brake comprising in combination a rotating shaft, a fixed braking abutment adjacent thereto, a gear slidably mounted on said shaft, a plurality of braking members disposed circumferentially about said gear, pins radially mounted on said gear for holding said braking members in place about said gear, said members having a limited movement in either direction circumferentially of said gear, and yielding means for maintaining said brake in inoperative position until the speed of the shaft attains a predetermined maximum.

10. A centrifugal brake comprising in combination a rotating shaft, a fixed braking abutment adjacent thereto, a gear slidably mounted on said shaft, a plurality of braking members disposed circumferentially about said gear, pins radially mounted on said gear for holding said braking members in place about said gear, said members having a limited movement in either direction circumferentially of said gear, and a helical spring for maintaining said brake in inoperative position until the speed of the shaft attains a predetermined maximum.

In testimony whereof, I have hereunto set my hand.

ARTHUR H. GIBSON.